United States Patent
LeHew (10) Patent No.: US 9,591,840 B2
(45) Date of Patent: Mar. 14, 2017

(54) UMBRELLA-TYPE FISHING RIG WITH REMOVABLE LURE ARMS

(71) Applicant: Troy LeHew, Charlotte, NC (US)

(72) Inventor: Troy LeHew, Charlotte, NC (US)

(*) Notice: Subject to any disclaimer, the term of this patent is extended or adjusted under 35 U.S.C. 154(b) by 59 days.

(21) Appl. No.: 14/568,903

(22) Filed: Dec. 12, 2014

(65) Prior Publication Data

US 2016/0165868 A1    Jun. 16, 2016

(51) Int. Cl.
| | |
|---|---|
| A01K 91/053 | (2006.01) |
| A01K 85/18 | (2006.01) |
| A01K 85/00 | (2006.01) |
| A01K 85/10 | (2006.01) |
| A01K 91/03 | (2006.01) |

(52) U.S. Cl.
CPC .......... *A01K 91/053* (2013.01); *A01K 85/00* (2013.01); *A01K 85/10* (2013.01); *A01K 85/18* (2013.01); *A01K 91/03* (2013.01)

(58) Field of Classification Search
CPC ........ A01K 85/00; A01K 85/10; A01K 85/18; A01K 91/053
USPC .................. 43/42.74, 42.13, 42.11
See application file for complete search history.

(56) References Cited

U.S. PATENT DOCUMENTS

| | | | | |
|---|---|---|---|---|
| 14,587 A | * | 4/1856 | Smith ................. | A01K 91/053 43/42.74 |
| 86,786 A | * | 2/1869 | Tellgmann ............ | A01K 93/00 43/42.74 |
| 1,352,979 A | * | 9/1920 | Lawrence ............ | A01K 91/053 43/42.74 |
| 1,782,010 A | * | 11/1930 | Meyer .................. | A01K 91/053 43/42.74 |
| 2,157,003 A | * | 5/1939 | Mussina ................ | A01K 93/00 43/42.74 |
| 2,223,922 A | * | 12/1940 | Schofield ............. | A01K 91/053 43/42.74 |
| 2,289,663 A | * | 7/1942 | Linhares ................ | A01K 93/00 43/42.74 |
| 2,462,290 A | * | 2/1949 | Sauvey ................ | A01K 91/053 43/42.74 |

(Continued)

FOREIGN PATENT DOCUMENTS

| | | | |
|---|---|---|---|
| JP | 10178987 A | * | 7/1998 |
| JP | 2008220182 A | * | 9/2008 |
| KR | 20130110334 A | * | 10/2013 |

OTHER PUBLICATIONS

Tournament Fishing Radio.com, First Look: Jewel Swim Gem Brella Rig, Mizzou answer to the Bama Rig. www.tournamentfishingradio.com/2011/12/first-look-jewel-swim-gem-brella-rig.html Oct. 25, 2013.

(Continued)

*Primary Examiner* — Darren W Ark
(74) *Attorney, Agent, or Firm* — Thorpe North & Western, LLP.

(57) ABSTRACT

An umbrella fishing rig can include a head piece, a cap, and at least one dual teaser arm piece. The head piece can include an arm retention portion. The at least one dual teaser arm piece can have two arms extending from the bent central portion. The cap can be removably coupled to the head piece. The arm retention portion can be configured to receive the bent central portion and the cap can retain the bent central portion in the arm retention portion.

15 Claims, 5 Drawing Sheets

(56) References Cited

U.S. PATENT DOCUMENTS

| | | | | |
|---|---|---|---|---|
| 2,780,023 A * | 2/1957 | Mercier | ............... | A01K 95/00 43/42.74 |
| 2,814,901 A * | 12/1957 | Suiter | ............... | A01K 85/00 43/42.74 |
| 2,877,593 A * | 3/1959 | Baldridge | ............ | A01K 91/053 43/42.74 |
| 2,877,594 A * | 3/1959 | Birrell | ............... | A01K 93/00 43/42.74 |
| 3,067,538 A * | 12/1962 | Hines | ............... | A01K 95/00 43/42.74 |
| 3,105,318 A * | 10/1963 | Birrell | ............... | A01K 93/00 43/42.74 |
| 3,270,458 A * | 9/1966 | McAfee | ............... | A01K 91/053 43/42.74 |
| 3,646,700 A * | 3/1972 | Pond | ............... | A01K 91/053 43/42.74 |
| 3,744,178 A * | 7/1973 | Denny | ............... | A01K 91/053 43/42.74 |
| 4,893,432 A * | 1/1990 | Rosengrant | ............ | A01K 91/053 43/42.74 |
| 4,920,687 A * | 5/1990 | Barnett | ............... | A01K 91/053 43/42.74 |
| 4,998,374 A * | 3/1991 | Barnett | ............... | A01K 91/08 43/42.74 |
| D364,444 S * | 11/1995 | DeCosta | ............... | D22/129 |
| 6,000,166 A * | 12/1999 | Kirkpatrick | ............ | A01K 91/06 43/42.74 |
| 6,108,962 A | 8/2000 | Barron | | |
| 7,412,795 B2 * | 8/2008 | Glynn | ............... | A01K 91/04 43/42.74 |
| D668,735 S * | 10/2012 | Steckelberg | ............... | D22/129 |
| D674,461 S * | 1/2013 | Woller | ............... | D22/129 |
| 8,572,887 B2 * | 11/2013 | Adelman | ............ | A01K 91/053 43/42.74 |
| D707,326 S * | 6/2014 | Moehring | ............... | D22/129 |
| D707,787 S * | 6/2014 | Moehring | ............... | D22/129 |
| 2003/0208948 A1 * | 11/2003 | Higgins | ............... | A01K 91/053 43/42.74 |
| 2005/0050790 A1 * | 3/2005 | Higgins | ............... | A01K 91/053 43/42.74 |
| 2012/0030991 A1 * | 2/2012 | Chatfield | ............... | A01K 85/00 43/43.1 |
| 2012/0055316 A1 * | 3/2012 | Smith | ............... | A01K 85/00 43/42.39 |
| 2012/0073182 A1 * | 3/2012 | Poss | ............... | A01K 85/16 43/42.13 |
| 2015/0096220 A1 * | 4/2015 | Buhler | ............... | A01K 91/053 43/42.11 |
| 2015/0181846 A1 * | 7/2015 | Taboada | ............... | A01K 91/053 43/42.32 |
| 2015/0201593 A1 * | 7/2015 | Prantl | ............... | A01K 85/00 43/42.19 |
| 2016/0235047 A1 * | 8/2016 | Mirabal | ............... | A01K 85/10 |
| 2016/0255822 A1 * | 9/2016 | Whitman | ............... | A01K 85/00 |

OTHER PUBLICATIONS

Landbigfish.com, ABT Lures Multi-Rig Umbrella System, www.landbigfish.com/ABTLures/ABTLures-Multi-Rig-Umbrella-System.cfm accessed Nov. 10, 2013.

123 Fishing Rigs and Lures, Bass and Game Fishing Rigs, www.123fishingrigs.com/bass-game-fishing-rigs.html accessed Nov. 10, 2013.

Mike Waler, The Whole Truth: Product Review Hyper Umbrella Rig, Explore the Possibilities http://www.fishing24-7guideservice.com/the_whole_truth_product_reviews/hyper_umbrella_rig accessed Jan. 10, 2013.

* cited by examiner

UMBRELLA-TYPE FISHING RIG WITH REMOVABLE LURE ARMS

RELATED APPLICATION

This application claims the benefit of U.S. Provisional Application No. 61/915,393, filed Dec. 12, 2013, which is incorporated herein by reference.

FIELD OF THE INVENTION

The present invention relates generally to the field of fishing equipment. More specifically, the present invention relates to umbrella-type fishing rigs with multiple arms.

BACKGROUND

Fishermen sometimes use umbrella fishing rigs to attract certain species of game fish. Further, such umbrella rigs also tend to attract larger size fish and can even occasionally land multiple fish with a single rig. These umbrella rigs are designed to mimic the appearance of a school of fish. Many umbrella rigs include a central member with multiple teaser arms extending outward, forming an umbrella-like shape. These arms can typically be made from metal wire or a similar material. Each arm can be equipped with various baits, hooks, lures, and other equipment to help attract and catch fish. Many umbrella rigs have teaser arms rigidly attached to a central member. The teaser arms can be subject to various forces during the process of casting, trolling, catching, and reeling in a fish. When subjected to these stresses over time, the teaser arms can break off. This lessens the effectiveness of the umbrella rig at attracting and catching fish, and may typically necessitate purchasing a new umbrella rig.

SUMMARY

An umbrella fishing rig in accordance with the present invention can include a head piece, a cap, and at least one dual teaser arm piece. The head piece can include an arm retention portion. The at least one dual teaser arm piece can have a bent central portion and two arms extending from the bent central portion. The cap can be removably coupled to the head piece. The arm retention portion can be configured to receive the bent central portion and the cap can retain the bent central portion in the arm retention portion.

In one embodiment, the arm retention portion can comprise a shoulder defining, at least in part, an arm receiving portion to receive the bent central portion of the dual teaser arm piece, such that the bent central portion rests on the shoulder.

In another embodiment, the cap can further comprise an arm capturing portion defined, at least in part, by an opening having an interior diameter larger than a diameter of the shoulder, such that the arm capturing portion covers the shoulder and the bent central portion of the dual teaser arm.

In yet another embodiment, the arm retention portion can further comprise an arm guide portion having an outer diameter greater than a diameter of the shoulder and having at least two grooves oriented parallel to a longitudinal axis of the head piece and extending radially inward. The grooves can have a sufficient width to receive and guide the arms of the dual teaser arm piece.

In still other alternatives, the bent central portion of the dual teaser arm piece can rest on the shoulder while the arms are retained in the grooves.

In one specific embodiment, the umbrella fishing rig can have two dual teaser arm pieces and the base guide portion can have four corresponding grooves.

In one embodiment, the cap can be removably coupled to the head piece with threaded coupling features.

In one specific alternative embodiment, the bent central portion of the dual teaser arm piece can be bent in a squared U-shape.

Typically, the umbrella fishing rig can include a fishing line attachment feature adapted to secure a fishing line.

For example, in one option, the fishing line attachment feature can be associated with the head piece.

In one embodiment, the cap can comprise an opening adapted to receive the fishing line attachment feature therethrough.

Although not always required, the head piece can be a single unitary structure.

In yet an additional optional embodiment, the umbrella fishing rig can include a second head piece connected to the first head piece by a connecting member.

In some optional embodiments, the umbrella fishing rig can include an attachment removably coupled to the head piece. For example, the attachment can be selected from a scent tube, a fishing lure, a weighting system, and the like.

In one embodiment, the head piece can be configured to removably couple with the attachment at a trailing end of the head piece.

In another embodiment, the head piece can be removably coupled to the attachment with threaded coupling features.

Dual teaser arms can be provided independently of the head piece as replacements, for example. A replacement dual teaser arm piece for an umbrella fishing rig in accordance with the present invention can include a bent central portion, two arms extending from the bent central portion, and a fishing tackle connector secured to each arm. The bent central portion can be adapted to be received by an arm retention portion of an umbrella fishing rig head piece as described herein.

In some embodiments, the replacement dual teaser arm piece can include one or more blades attached to the arms for simulating the appearance of fish.

Although various connectors can be used, the fishing tackle connector can often be a swivel, snap, split ring, or combinations thereof.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

It should be noted that the figures are merely exemplary of several embodiments of the present invention and no limitations on the scope of the present invention are intended thereby. Further, the figures are generally not drawn to scale, but are drafted for purposes of convenience and clarity in illustrating various aspects of the invention.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

DEFINITIONS

In describing and claiming the present invention, the following terminology will be used. The singular forms "a," "an," and "the" include plural references unless the context clearly dictates otherwise. Thus, for example, reference to "a head piece" includes reference to one or more of such structures, "a metal" includes reference to one or more of such materials, and "a machining step" refers to one or more of such steps.

As used herein, "about" refers to a degree of deviation based on experimental error typical for the particular property identified. The latitude provided by the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

Dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, and sub-ranges such as 10 to 50, 20 to 100, etc.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited immediately following. The structure, material or acts that support the means-plus function are expressly recited in the description herein. Accordingly, the scope of the invention should be determined solely by the appended claims and their legal equivalents, rather than by the descriptions and examples given herein.

Umbrella Fishing Rig

An umbrella fishing rig according to the present invention can include flexible, removable arms. Many previous designs for umbrella rigs are prone to break after several uses, and without removable arms the entire rig must be replaced or repaired. The removable arms of the umbrella rigs according to the present invention can be easily replaced, making it easy and inexpensive to replace broken arms instead of buying an entire replacement rig or expending time with repairs. Furthermore, the mechanism used to retain the teaser arms in place on the head piece allows the arms to have a sufficient amount of flexibility to reduce stress on the arms and make breakage less likely compared to other umbrella rigs that have rigidly mounted teaser arms.

Figure 1A:
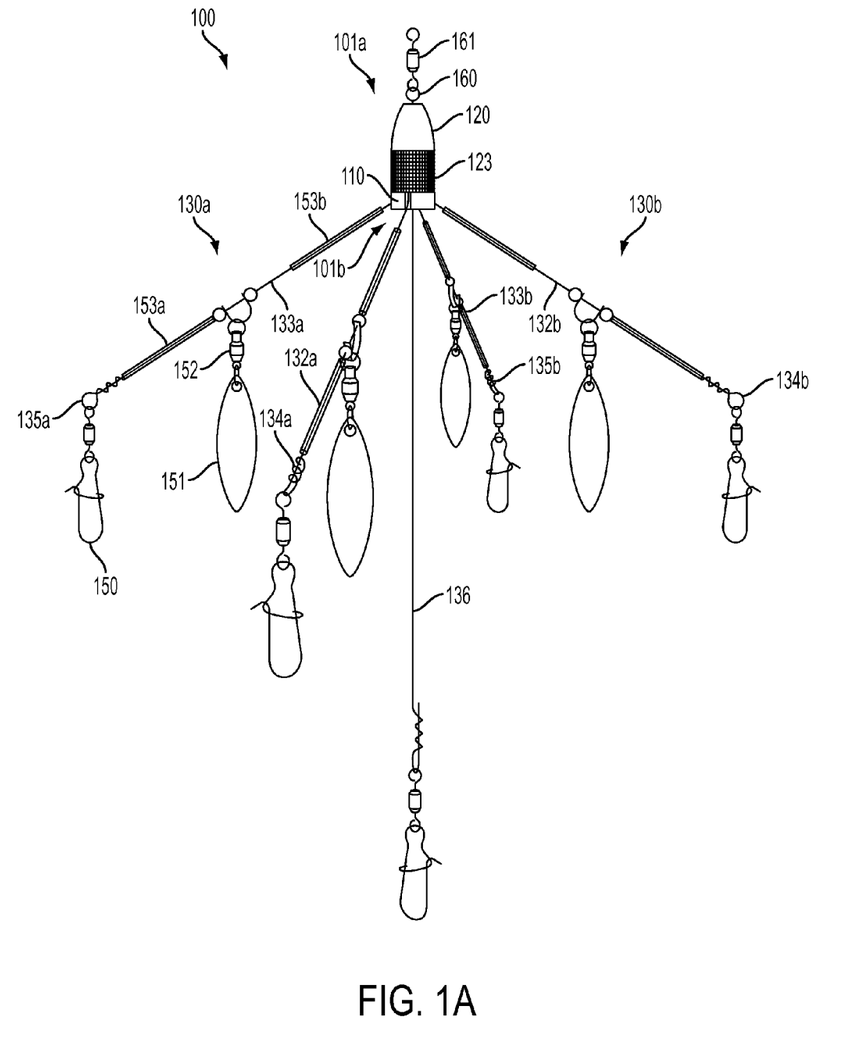
FIG. 1A illustrates an umbrella fishing rig in accordance with an embodiment of the present invention.
Figure 1B:
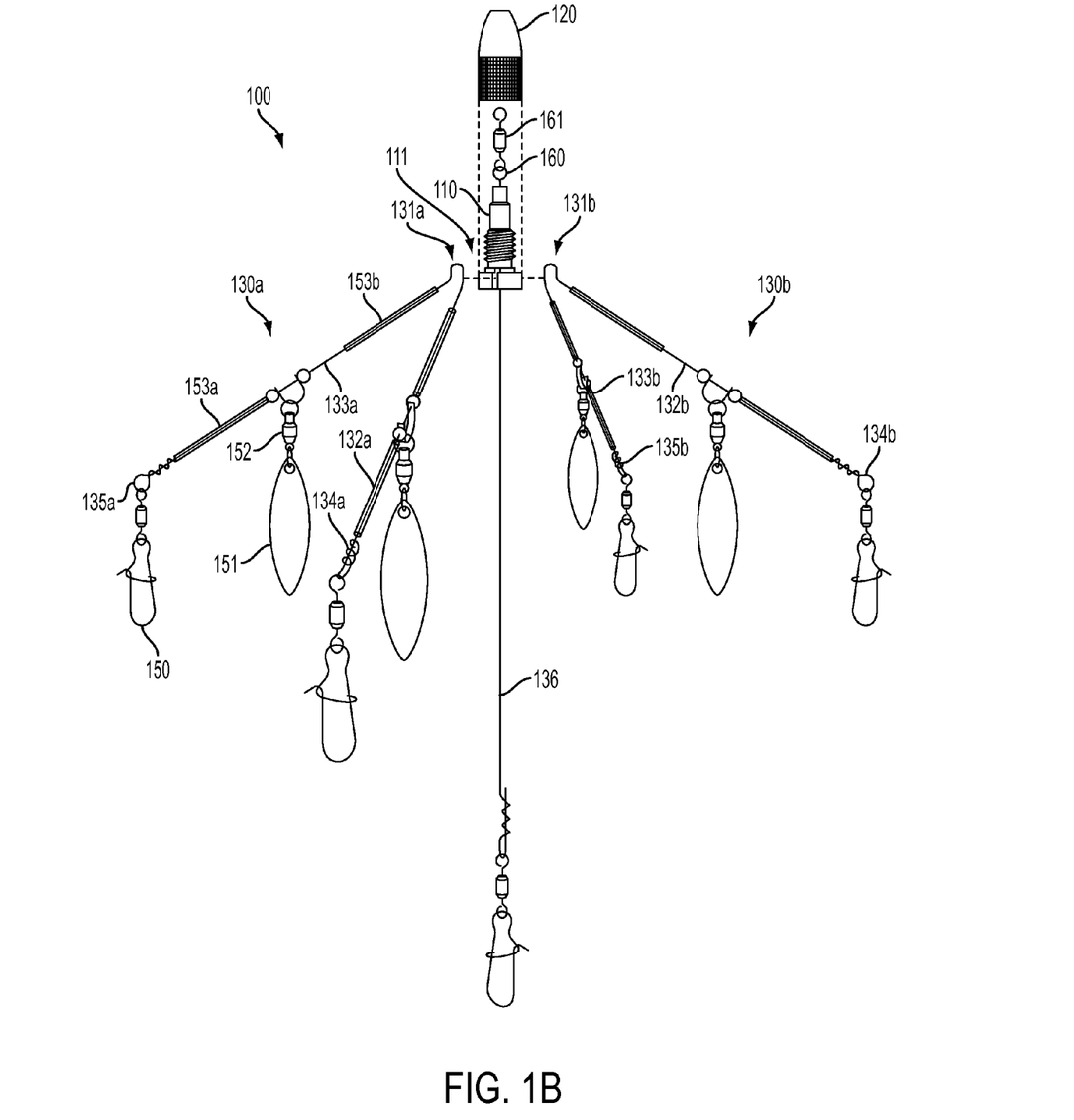
FIG. 1B is an exploded view of the umbrella fishing rig of FIG. 1A.

With the above in mind, an umbrella fishing rig 100 in accordance with the present invention is illustrated in FIGS. 1A and 1B. In general, the umbrella fishing rig can include a head piece 110, a cap 120, and at least one dual teaser arm piece 130a, 130b. The dual teaser arm piece can have a bent central portion 131a, 131b (shown in FIG. 1B) and two arms 132a, 133a, 132b, 133b extending from the bent central portion. The head piece can have an arm retention portion 111 (shown in FIG. 1B) that can be configured to receive the bent central portion. The cap can be removably coupled to the head piece, such as by threaded coupling features 141, 142, and can retain the bent central portion in the arm retention portion.

Figure 2A:
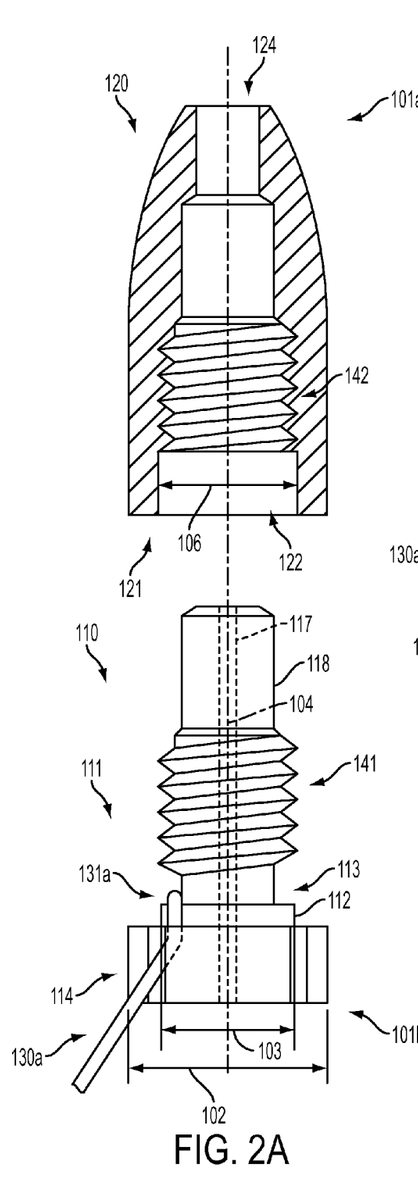
FIG. 2A is a detail view of a cap, a head piece, and a dual teaser arm piece of the umbrella fishing rig of FIG. 1A.
Figure 2B:
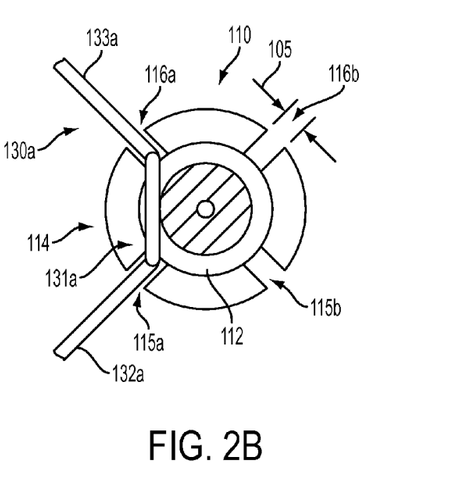
FIG. 2B is a top cross-sectional view of the head piece and the dual teaser arm piece of FIG. 2A.

FIGS. 2A and 2B are detail views that illustrate features and aspects of FIGS. 1A and 1B that facilitate retention of a dual teaser arm piece. Certain components have been omitted for clarity. For example, only dual teaser arm piece 130a is illustrated in FIGS. 2A and 2B. In one aspect, the arm retention portion 111 can include a shoulder 112 that can define, at least in part, an arm receiving portion 113 to receive the bent central portion 131a of the dual teaser arm piece, such that the bent central portion rests on the shoulder. For example, the arm receiving portion can provide a space in which the bent central portion of a dual teaser arm piece rests or resides. In some embodiments, the arm receiving portion can be a circumferential groove in the head piece. This groove can be appropriately sized to accept the bent central portion of the dual teaser arm pieces. In other embodiments the arm receiving portion can simply be an unthreaded area of the head piece, such as just below the threads 141. The shoulder can be below the arm receiving portion thus creating a space where the bent central portion of the dual teaser arm piece can rest, such as on a surface of the shoulder toward a leading end 101a of the head piece and within the arm receiving portion. In some embodiments, the shoulder can have a plurality of notches to hold teaser arms. These notches can help hold the arms in place while the cap is being screwed on.

The arm retention portion can also include an arm guide portion 114 having an outer diameter 102 greater than a diameter 103 of the shoulder 112. For example, the arm guide portion can be below the shoulder and can extend out to a greater diameter than the shoulder. The arm guide portion can also include at least two grooves 115a, 116a, 115b, 116b oriented parallel to a longitudinal axis 104 of the head piece and extending radially inward. The grooves can have a sufficient width 105 to receive and guide the arms of the dual teaser arm piece. For example, the arm guide portion in FIG. 2B has four grooves cut parallel to the longitudinal axis of the head piece extending inwardly from a circumferential surface of the arm guide portion. Because there are four grooves, this head piece can accommodate two dual teaser arm pieces. The four arms of the two dual teaser arm pieces extend down from the bent central portions 131a, 131b (as shown in FIGS. 1A and 1B), and the arms fit into the grooves in the arm guide portion. In one aspect, these grooves can have a sufficient width to accept and guide the arms of the dual teaser arm pieces without rigidly restraining or securing the arm pieces. Additional grooves can optionally be added to accommodate a greater number of dual teaser arms (e.g., three or four dual teaser arms providing six or eight total arms, respectively).

Generally, the arm guide portion 114 can have at least two grooves. The number of grooves can be a multiple of two, so that there will be enough grooves to accept the desired number of teaser arms from dual teaser arm pieces. For example, in some embodiments the arm guide portion can have 2, 4, 6, 8 or more grooves to hold the arms of 1, 2, 3, 4 or more dual teaser arm pieces, respectively. In one particular embodiment (shown in FIG. 2B), the arm guide portion 114 can have four grooves which are configured to accept the arms from two dual teaser arm pieces. In some embodiments, the grooves can be equally spaced about the circumference of the arm guide portion. Optionally, the grooves can be offset so as to form a non-uniform pattern of extending teaser arms. The teaser arms can be retained in the grooves while the bent central portion 131a of the dual teaser arm 130a piece rests on the leading end surface of the shoulder 112 (shown in FIG. 2A). Also, in some embodiments the grooves can be aligned with notches in the shoulder so that the notches and grooves both hold the teaser arms in place.

In addition, the cap 120 can have an arm capturing portion 121 defined, at least in part, by an opening 122 having an interior diameter 106 larger than the diameter 103 of the shoulder 112. The arm capturing portion can therefore cover the shoulder and the bent central portion 131a of the dual teaser arm to retain the dual teaser arm. For example, as shown in FIG. 2A, the cap 120 can include an opening in a trailing end 101b of the cap with an interior diameter large enough to retain the bent central portions of any dual teaser arm pieces within the arm receiving portion 113. The opening at the bottom of the cap is larger than the diameter of the shoulder on the head piece so that the opening can cover the shoulder when the cap is engaged with the head piece. The opening is also smaller than the outer diameter of the arm guide portion 114 so that the trailing end of the cap can abut the arm guide portion when the cap is engaged with the head piece. The opening in the cap can also be large enough that the bent central portions of any dual teaser arms can be retained within the arm receiving portion by the arm capturing portion when the cap is coupled to the head piece. Thus, the bent central portion of the dual teaser arm piece can rest on the shoulder while the arms are retained in the grooves. In one aspect, the arm capturing portion can capture or retain the bent central portion without rigidly securing the bent central portion and/or the arms. In this way, there can be sufficient space or room for "play" or movement of the bent central portion and/or the arms during use, thus reducing stress on the arms that tends to cause the arms to break.

As mentioned above, the cap 120 and the head piece 110 are removably coupleable to one another. As illustrated in FIG. 2A, the head piece includes external threads 141 and the cap includes internal threads 142 that are configured to mate or interface with one another. Although threaded coupling features are shown, it should be recognized that any suitable type of removable coupling feature can be utilized. For example, in other embodiments other coupling features can be used such as, clips, spring clips, latches, locking pins, detents, etc. can be used.

In one aspect (shown in FIGS. 1A and 1B), the umbrella rig 100 can utilize a plurality of dual teaser arm assemblies 130a, 130b. In some embodiments, the bent central portion 131a, 131b can be bent in a squared U-shape, as shown in FIG. 1B. This shape is shown in the figure at the bent central portion of the dual teaser arm pieces, which have been separated from the head piece 110 and the cap 120. The bent central portion can be bent so as to complement opening and retention portions within the head piece and cap assembly, as discussed above with respect to FIGS. 2A and 2B. For example, the bent central portion can rest on the shoulder 112 in the arm receiving portion 113 of the head piece while the teaser arms 132a, 133a are held in place and guided by the grooves in the arm guide portion and/or notches in the shoulder. The squared U-shape can include two bends of about 90 degrees each, so that the teaser arms can be roughly parallel. When the dual teaser arm pieces are assembled with the head piece and cap, the teaser arms can be bent outward at an angle to form an umbrella shape as shown in the figures. The angle of bending the teaser arms can be customized to suit individual fishermen and scenarios. The arms can be straight or bent into a curve shape.

The teaser arm piece and/or the teaser arms disclosed herein can generally be made of a bent wire. Various materials can be used, such as stainless steel, aluminum, titanium, carbon fiber, rigid polymers, and the like. In addition, supplemental equipment can be secured on the teaser arms. For example, as shown in FIGS. 1A and 1B, the teaser arms 132a, 133a, 132b, 133b can have a fishing tackle connector 150 secured at the end of each arm. The fishing tackle connectors can be used to secure terminal fishing tackle to the umbrella rig, including but not limited to, lures, hooks, baits, and so on. The figures show snap-lock clasps at the ends of the teaser arms, although other types of fishing tackle connectors can be used such as swivels, snaps, split rings, or combinations thereof. The teaser arms can have an attachment point 134a, 135a, 134b, 135b at the ends adapted to secure the fishing tackle connector. As shown in the figures, in one embodiment the attachment point can be formed by looping the wire teaser arm at the end and twisting the wire to form an eyelet.

In one aspect, the teaser arms can also be equipped with blades 151 for simulating the appearance of small fish. In one embodiment, the blades can be nickel plated to increase reflectivity of the blades. With blades attached to multiple teaser arms, the umbrella lure can have the appearance of a school of small fish. This can be useful to attract certain species and sizes of game fish. In one aspect, the blades can be on ball bearing swivels 152. Spacers 153*a*, 153*b* can be added to the teaser arms to keep the blades positioned near the center of the arms.

Replacement dual teaser arm pieces for umbrella fishing rigs can be produced for repairing umbrella rigs with broken arms. The replacement dual teaser arm pieces can be configured as described above. For example, the replacement dual arm pieces can have a bent central portion and two arms extending from the bent central portion. The bent central portion can be adapted to be received by the arm retention portion 111 of the head piece 120. A fishing tackle connector can be secured to each arm. In some embodiments, the dual teaser arm piece can include blades for simulating the appearance of fish as explained above. In some embodiments, the fishing tackle connector can include a swivel, snap, split ring, or combinations thereof.

In one aspect, the head piece 110 can be a single unitary structure. For example, the head piece can be formed from a solid piece of suitable material. In some embodiments the head piece can be formed of a metal such as aluminum, steel, lead, titanium, or other suitable metal. Alternatively, the head piece can be formed of a polymer, composite or other suitable material. Non-limiting examples can include acetal polymers (e.g., DELRIN), polycarbonate, polyesters, acrylates, carbon fiber, and the like. The head piece can be formed by a variety of methods, such as machining or casting. In one embodiment, the head piece can be formed by turning a piece of aluminum on a precision lathe. In other embodiments, the head piece can be assembled from multiple parts. For example, a central portion such as a threaded bolt can form the threaded coupling feature and the arm retention portion can be made by screwing separate pieces onto the bolt. Parts of the arm retention portion, such as the arm receiving portion, the shoulder, and the arm guide portion, can be machined or cast or formed by screwing nuts, washers, and other such pieces onto the bolt. Generally, the head piece can be a single unitary piece or the head piece can be formed of any combination of parts designed to operate as a head piece.

In one aspect, the cap 120 can have a tapered leading end (as shown in FIGS. 1A-2A), which can help reduce drag as the umbrella rig is drawn through the water. The cap can also be cut with knurling grooves 123 (FIGS. 1A and 1B) around a trailing end portion of the cap, to provide extra grip while screwing the cap onto the head piece or removing the same. In other embodiments, the cap can be presented with other shapes and include other features. For example, the cap can be non-cylindrical having angular sidewalls (e.g., square, pentagon, hexagon, etc as a cross section). Generally, the cap can include a coupling feature configured to engage with the head piece, and the cap can be configured in size and shape to retain the bent central portion of dual teaser arm pieces with the arm retention portion while the cap is coupled to the head piece.

In some embodiments, the umbrella rig 100 can have a fishing line attachment feature 160 adapted to secure a fishing line. In one aspect, the fishing line attachment feature can be associated with the head piece 110. As shown in FIGS. 1A and 1B, this fishing line attachment feature can include an eyelet extending from the leading end of the head piece for attaching a fishing line. In one embodiment, the eyelet can be attached to a swivel 161 as shown in the figures, and the fishing line can be attached to the swivel to allow the umbrella rig to rotate freely without twisting the fishing line.

In some embodiments, as illustrated in FIG. 2A, the cap 120 can include an opening 124 in the leading end of the cap for receiving the head piece 110 and exposing a fishing line attachment feature on the leading end of the head piece. For example, the cap can have an opening or a hole in the leading end of the cap to receive the fishing line attachment feature 160 therethrough so that the cap can screw down onto the head piece while the fishing line attachment feature is exposed through the hole in the cap. With the fishing line attachment feature on the head piece and not the cap, the umbrella rig can rotate while in use, such as under the force of water currents or caught fish, without exerting any angular force on the cap which could cause the cap to loosen. Furthermore, the cap can be removed and arms replaced while maintaining the cap and head piece together since the cap is retained along the fishing line. This can reduce chances of dropped or misplaced parts during arm replacements or adjustments. However, in other embodiments, the fishing line attachment feature can be secured on the leading end of the cap instead of the head piece.

In one aspect, the fishing line attachment feature 160 (see FIGS. 1A and 1B) can be formed using a loop of wire that is inserted through the head piece. The head piece can have a bore 117 (illustrated in FIG. 2A) running from the leading end of the head piece to the trailing end. The bore size can be sufficient to insert a wire through the bore. In the embodiment shown in the figures, the wire can be held in place by compressing a section 118 of the head piece near the leading end. After the wire is inserted, this compression portion can be compressed using a press or vice. The compression can hold the wire securely in place. Alternatively, the wire can be secured by welding, adhesive or any other suitable mechanism. As shown in the figures, the portion of wire protruding from the leading end can be looped to form the fishing line attachment feature. The portion of wire protruding from the trailing end can have a variety of uses. For example, as shown in FIGS. 1A and 1B, the wire protruding from the trailing end can be an additional teaser arm 136.

Figure 3:
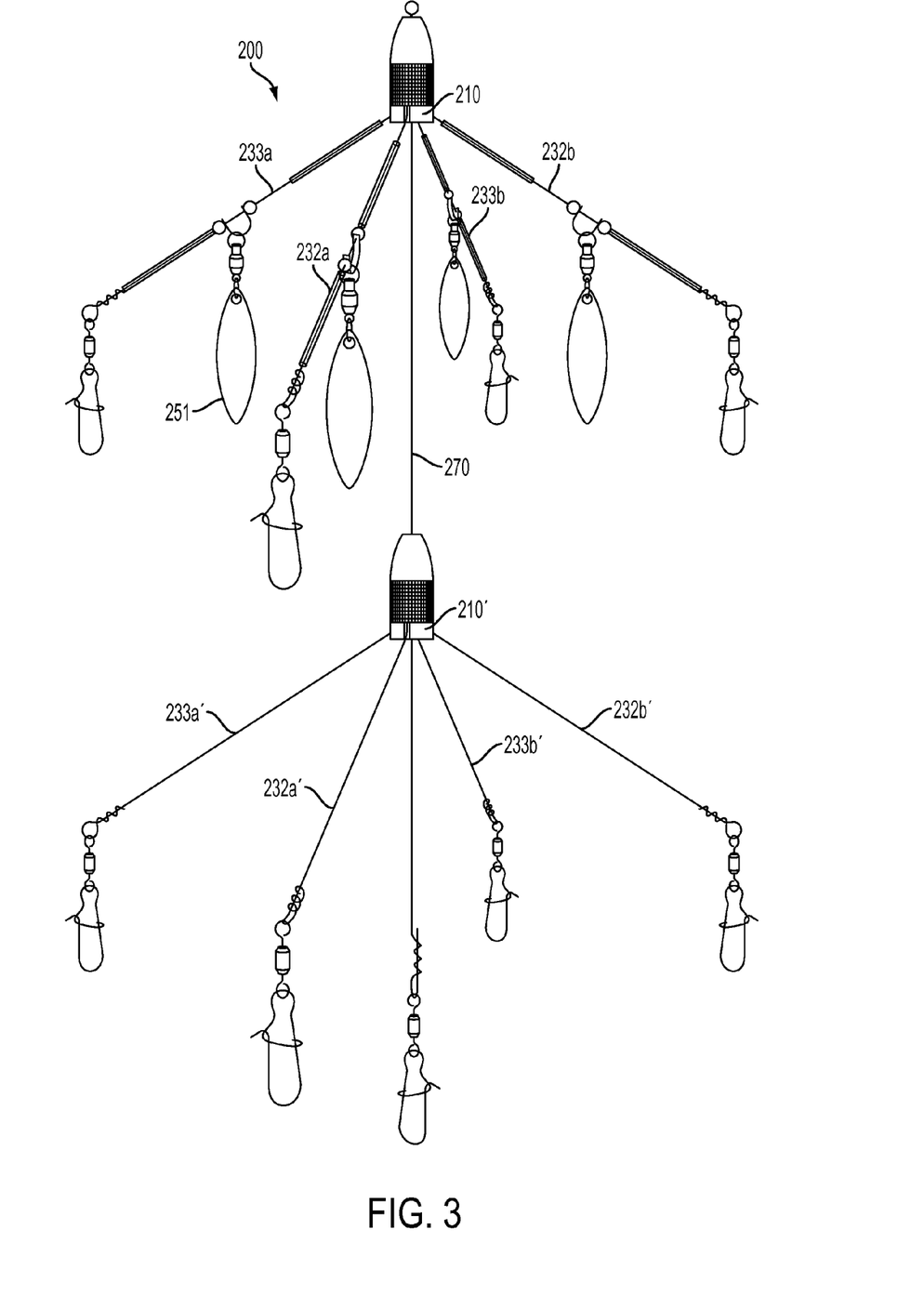
FIG. 3 illustrates an umbrella fishing rig including two rig assemblies connected in series in accordance with an embodiment of the present invention.

FIG. 3 illustrates an umbrella fishing rig 200 in accordance with another embodiment of the present invention. The umbrella fishing rig 200 is similar in many respects to the umbrella fishing rig 100 discussed above. As shown, a wire protruding from the trailing end of a head piece 210 can be a connecting member 270, connecting the head piece 210 to another head piece 210' to create a double umbrella rig. Any number of umbrella rigs can be strung together in this way.

In general, the teaser arms as disclosed herein can be various sizes depending on the species of fish being caught. For example, the teaser arms can be about 3.5 to about 4 inches long. More generally, for a small umbrella rig the teaser arms can be from about 2 to about 6 inches long. A larger umbrella rig can have teaser arms from about 6 to about 12 inches long. In one aspect, an umbrella rig can have teaser arms of multiple different lengths. For example, in the embodiment shown in FIG. 3, the teaser arms 232*a*, 233*a*, 232*b*, 233*b* associated with the first head piece 210 are about 3.5 inches long, and the teaser arms 232*a*, 233*a*, 232*b*, 233*b* associated with the second head piece 210' are about 4 inches long. In one embodiment, a double umbrella rig can have blades 251 attached to the teaser arms on the first head piece and no blades on the arms attached to the second piece, as shown in FIG. 3. The blades can be from about 1 to about 2 inches long. In FIG. 3, the blades are about 1.25 inches long. In one aspect, arms having different lengths and/or features (i.e., blades) can be selected and interchanged to provide a customized lure configuration for a given fish species or body of water.

Figure 4:
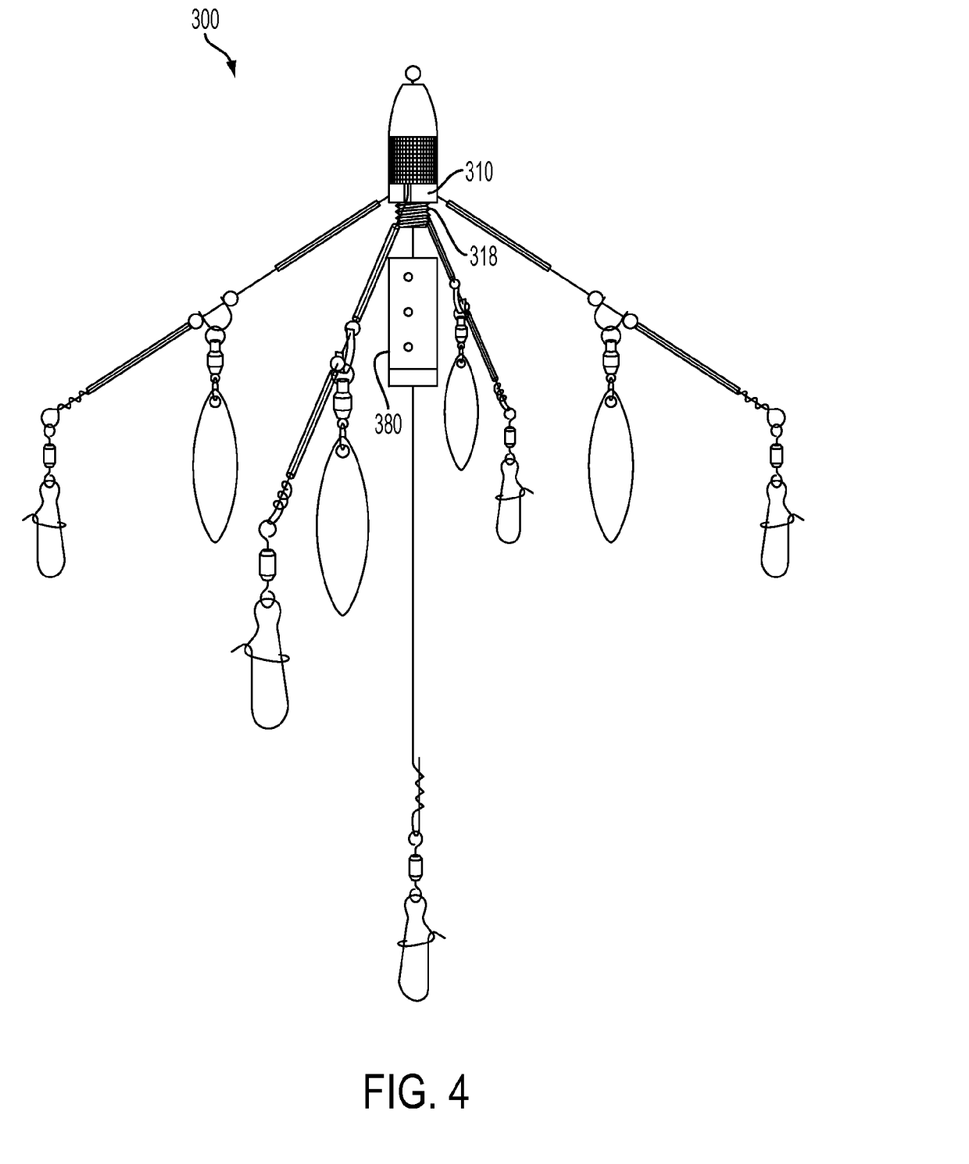
FIG. 4 illustrates an umbrella fishing rig with a scent tube in accordance with an embodiment of the present invention.

FIG. 4 illustrates an umbrella fishing rig 300 in accordance with yet another embodiment of the present invention. The umbrella fishing rig 300 is similar in many respects to the umbrella fishing rigs 100, 200 discussed above. As shown in FIG. 4, an attachment 380 can be removably coupled to a head piece 310. In one aspect, the head piece can be configured to removably couple with the attachment at a trailing end of the head piece. For example, the head piece can have a rear coupling feature 318 which is securable to the attachment. A variety of useful attachments can be secured to the head piece. For example, scent tubes can be attached which release scents that help to attract fish. Weight systems can also be attached to control depth of the umbrella rig during use. An additional fishing lure can also be secured to the rear coupling feature of the head piece. The attachment shown in the figure is a scent tube with interior threads that are configured to engage with the threads on the head piece. Thus, as shown in the figure, the head piece can have a threaded coupling feature configured to mate or interface with a complementary threaded coupling feature of an attachment. In other embodiments, other types of coupling features can be used, such as, clips, spring clips, latches, locking pins, detents, etc.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. An umbrella fishing rig, comprising:
   a head piece having an arm retention portion;
   at least one dual teaser arm piece having a bent central portion and two arms extending from the bent central portion; and
   a cap removably coupled to the head piece, wherein the arm retention portion is configured to receive the bent central portion and the cap retains the bent central portion in the arm retention portion,
   wherein the arm retention portion comprises a shoulder defining, at least in part, an arm receiving portion to receive the bent central portion of the at least one dual teaser arm piece, such that the bent central portion rests on the shoulder and wherein the arm retention portion further comprises an arm guide portion having an outer diameter greater than a diameter of the shoulder and having at least two grooves oriented parallel to a longitudinal axis of the head piece and extending radially inward, wherein the grooves have a sufficient width to receive and guide the arms of the at least one dual teaser arm piece.

2. The umbrella fishing rig of claim 1, wherein the cap further comprises an arm capturing portion defined, at least in part, by an opening having an interior diameter larger than the diameter of the shoulder, such that the arm capturing portion covers the shoulder and the bent central portion of the at least one dual teaser arm piece.

3. The umbrella fishing rig of claim 1, wherein the bent central portion of the at least one dual teaser arm piece rests on the shoulder while the arms are retained in the grooves.

4. The umbrella fishing rig of claim 1, wherein the at least one dual teaser arm piece comprises two dual teaser arm pieces and the at least two grooves of the arm guide portion comprises four grooves.

5. The umbrella fishing rig of claim 1, wherein the cap is removably coupled to the head piece with threaded coupling features.

6. The umbrella fishing rig of claim 1, wherein the bent central portion of the at least one dual teaser arm piece is bent in a squared U-shape.

7. The umbrella fishing rig of claim 1, further comprising a fishing line attachment feature adapted to secure a fishing line.

8. The umbrella fishing rig of claim 7, wherein the fishing line attachment feature is associated with the head piece.

9. The umbrella fishing rig of claim 8, wherein the cap comprises an opening adapted to receive the fishing line attachment feature therethrough.

10. The umbrella fishing rig of claim 1, wherein the head piece is a single unitary structure.

11. The umbrella fishing rig of claim 1, further comprising a second head piece connected to the head piece by a connecting member.

12. The umbrella fishing rig of claim 1, further comprising an attachment removably coupled to the head piece.

13. The umbrella fishing rig of claim 12, wherein the attachment is at least one of a scent tube, a fishing lure, weights, and combinations thereof.

14. The umbrella fishing rig of claim 12, wherein the head piece is configured to removably couple with the attachment at a trailing end of the head piece.

15. The umbrella fishing rig of claim 14, wherein the head piece is removably coupled to the attachment with threaded coupling features.

* * * * *